(12) United States Patent
Yuan et al.

(10) Patent No.: US 7,197,390 B2
(45) Date of Patent: Mar. 27, 2007

(54) ELECTRIC VEHICLE WITH ADAPTIVE CRUISE CONTROL SYSTEM

(75) Inventors: Guohui Yuan, Greenbelt, MD (US); Boris Maslov, Reston, VA (US)

(73) Assignee: Wavecrest Laboratories LLC, Rochester Hills, MI (US)

( * ) Notice: Subject to any disclaimer, the term of this patent is extended or adjusted under 35 U.S.C. 154(b) by 418 days.

(21) Appl. No.: 10/386,599

(22) Filed: Mar. 13, 2003

(65) Prior Publication Data

US 2004/0181323 A1    Sep. 16, 2004

(51) Int. Cl.
  *B60T 7/12*     (2006.01)
  *G05D 1/00*    (2006.01)
  *G06F 17/00*   (2006.01)
  *G06F 7/00*    (2006.01)

(52) U.S. Cl. .......................... 701/93; 701/22; 701/70; 318/437; 318/685; 363/17

(58) Field of Classification Search ............... 701/22, 701/93; 318/138–139, 539, 254, 437, 65.8, 318/801, 685; 180/65.7; 310/77, 115, 156.38, 310/156.53, 261; 363/17
See application file for complete search history.

(56) References Cited

U.S. PATENT DOCUMENTS

| | | | |
|---|---|---|---|
| 4,333,042 A | | 6/1982 | Kawada et al. |
| 4,538,100 A | * | 8/1985 | Tuten et al. .................. 318/808 |
| 4,707,650 A | * | 11/1987 | Bose ............................ 318/685 |
| 5,034,675 A | | 7/1991 | Nerowski et al. |
| 5,642,270 A | * | 6/1997 | Green et al. .................... 363/17 |
| 5,804,935 A | * | 9/1998 | Radev .......................... 318/139 |
| 6,002,234 A | | 12/1999 | Ohm et al. |
| 6,005,358 A | * | 12/1999 | Radev .......................... 318/139 |
| 6,388,419 B1 | * | 5/2002 | Chen et al. ................... 318/727 |
| 6,727,668 B1 | | 4/2004 | Maslov et al. |
| 6,911,794 B2 | * | 6/2005 | Maslov et al. ............... 318/437 |
| 2002/0116100 A1 | * | 8/2002 | Shimazaki et al. ........... 701/22 |
| 2003/0046028 A1 | | 3/2003 | Mir et al. |
| 2004/0021437 A1 | * | 2/2004 | Maslov et al. ............... 318/254 |
| 2004/0090195 A1 | * | 5/2004 | Motsenbocker ............. 318/109 |
| 2004/0104637 A1 | * | 6/2004 | Dube et al. .................. 310/177 |
| 2004/0222762 A1 | * | 11/2004 | Maslov et al. ............... 318/437 |

(Continued)

FOREIGN PATENT DOCUMENTS

EP    000548747 A1 * 12/1992

(Continued)

OTHER PUBLICATIONS

Morchin et al., Energy management in hybrid electric vehicles, 1998, IEEE, pp. 141-1 to 141-6.*

(Continued)

*Primary Examiner*—Thomas Black
*Assistant Examiner*—McDieunel Marc
(74) *Attorney, Agent, or Firm*—Proskauer Rose LLP (57) ABSTRACT

A novel system for adaptively controlling an electric vehicle to maintain desired speed under variable driving conditions. The system includes a control circuit for producing a control signal to control an electric motor of the vehicle. The control signal is formed based on a control current required to achieve the desired speed. The control strategy selection circuit is configured in the system to determine a motor control scheme that provides an appropriate waveform profile of the control current.

25 Claims, 5 Drawing Sheets

U.S. PATENT DOCUMENTS

2005/0012486 A1* 1/2005 Crain et al. .................. 318/719

FOREIGN PATENT DOCUMENTS

| EP | 000953471 A2 | * | 11/1999 |
|---|---|---|---|
| EP | 001000796 A2 | * | 5/2000 |
| EP | 2792582 | * | 10/2000 |
| EP | 001127732 A2 | * | 8/2001 |
| EP | 001297992 A2 | * | 2/2003 |
| GB | 2078029 | * | 6/1982 |
| WO | WO 95/34946 | * | 12/1995 |
| WO | WO 01/20751 A2 | | 3/2001 |
| WO | WO 2004/001945 | | 12/2003 |
| WO | WO 2004/001949 | | 12/2003 |

OTHER PUBLICATIONS

Aylor et al., An electrically assisted, hybrid vehicle, 1998, IEEE, pp. 2089.1-2089.6.*
Saeks et al., Adaptive control of a hybrid electric vehicle, 2000, IEEE, pp. 2405-2410.*
Phillips et al., Vehicle system controller design for a hybrid electric vehicle, 2000, IEEE, pp. 297-302.*
Luo et al., Advanced PM brushless DC motor control & system for electric vehicles, 2000, Internet, pp. 1-8.*

* cited by examiner

ELECTRIC VEHICLE WITH ADAPTIVE CRUISE CONTROL SYSTEM

RELATED APPLICATIONS

This application contains subject matter related to U.S. application Ser. No. 09/826,423 of Maslov et al., filed Apr. 5, 2001, now U.S. Pat. No. 6,492,756, U.S. application Ser. No. 09/826,422 of Maslov et al., filed Apr. 5, 2001, now U.S. Pat. No. 6,49,864, U.S. application Ser. No. 09/966,102, of Maslov et al., filed Oct. 1, 2001, now U.S. Pat. No. 6,787,951, U.S. application Ser. No. 09/993,596 of Pyntikov et al., filed Nov. 27, 2001, now U.S. Pat. No. 6,927,524, U.S. application Ser. No. 10/173,610, of Maslov et al., filed Jun. 19, 2002, now U.S. Pat. No. 6,727,668, U.S. application Ser. No. 10/290,537, of Maslov et al., filed Nov. 8, 2002, now U.S. Pat. No. 6,794,839, and U.S. application Ser. No. 10/353,075, of Maslov et al., filed Jan. 29, 2003, now U.S. Pat. No. 6,940,242. The disclosures of these applications are incorporated by reference herein.

FIELD OF THE INVENTION

The present invention relates to electric vehicles, and more specifically, to an electric vehicle equipped with a cruise control system adaptable in accordance with driving conditions.

BACKGROUND ART

A cruise control system in a vehicle provides automatic speed control to enable the vehicle to maintain constant speed under variable driving conditions without driver's intervention. A conventional cruise control system in an electric vehicle controls an electric motor of the vehicle to request a torque value required to achieve a desired speed.

For example, U.S. Pat. No. 5,615,933 describes an electric vehicle having an electric motor propulsion system, a brake system and a control unit, which includes a motor control controlling the propulsion system, and a brake control for controlling the brake system. The motor propulsion system includes a three-phase AC electric motor that provides traction force to vehicle drive wheels. The motor control provides control commands to the electric motor. In particular, the motor control derives a torque command that defines the torque to be applied to the wheels by the motor. The motor control comprises an electronic cruise control system that receives a vehicle speed signal from a vehicle speed sensor. In response to the vehicle speed signal, the motor control issues a command to set the motor either into an accelerating or a braking mode to achieve a desired speed. In the accelerating mode, an accelerating torque command is issued by the motor control to request the motor to increase the torque applied to the wheels so as to reach the desired speed.

Under typical driving conditions, torque values required to achieve a desired speed are subject to wide variability with little, if any, long term predictability. Moreover, driving conditions, such as steep uphill grade or heavy vehicle load or the like, may impose limitations on available speed and acceleration.

Higher acceleration or greater speed may be required than the system can accommodate at maximum torque restricted by available motor performance. In particular, the voltage signal that the motor control needs to produce in order to request the torque required to achieve the desired speed may be greater than the supply voltage. Therefore, the motor would not be able to develop the required torque.

Accordingly, there is a need for a cruise control system that would be able to control the electric motor of a vehicle in order to produce high torque required to maintain the vehicle at a desired speed.

In addition, in a vehicle drive environment, wherein power availability is limited to an on-board supply, it is highly desirable to attain a high torque output capability at minimum power consumption. Motor structural arrangements described in the copending applications contribute to these objectives. As described in those applications, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects occurring from interaction with other electromagnet members.

The above-identified copending application Ser. No. 10/173,610 describes a control system for a multiphase motor that compensates for variations in individual phase circuit elements. A high degree of precision controllability is obtained with each phase control loop closely matched with its corresponding winding and structure. Successive switched energization of each phase winding is governed by a controller that generates signals in accordance with parameters associated with the respective stator phase components. The phase windings are energized with current of sinusoidal waveform for high efficiency operation. The control system varies the output current to respond to, and accurately track, the torque command input.

The sinusoidal current waveform profile obtained with this commutation strategy can extend battery life through efficient operation. However, in vehicle driving operation there may be a need for torque capability in excess of that available from the most efficient control scheme. Typically, the power supply is rated for a maximum current discharge rate, for example, 10.0 amps. If the cruise control system requests a torque command that correlates to this maximum current draw, then the motor torque output for a sinusoidal current waveform profile is limited, for example, to approximately 54.0 Nm in a motor with a configuration such as described above.

The need thus exists for an electric vehicle cruise control system that is capable of adaptively controlling the electric motor to enable its operation with high efficiency yet can deliver increased torque output when required to maintain a desired speed.

DISCLOSURE OF THE INVENTION

The present invention fulfills this need by providing a system for adaptively controlling an electric vehicle to maintain desired speed under available driving conditions. The system includes a control circuit for producing a control signal to control an electric motor of the vehicle. The control signal is formed based on a control current required to achieve the desired speed. The control strategy selection circuit is configured in the system to determine a motor control scheme that provides an appropriate waveform profile of the control current.

For example, the control strategy selection circuit may select a high-efficiency control scheme that provides a waveform profile for achieving operating efficiency of the motor. Alternatively, a high-torque control scheme may be selected to provide a waveform profile for achieving high torque, when the high-efficiency control scheme is not sufficient to achieve the desired speed. While the operating efficiency waveform profile may have a substantially sinusoidal waveshape, the high-torque waveform profile may have a substantially rectangular waveshape.

The motor control scheme may be selected in response to actual speed of the vehicle and torque required to achieve the desired speed. The high-efficiency control scheme is chosen when the required torque at a given speed does not exceed a threshold level. The high-torque control scheme is selected when the required torque exceeds the threshold level.

In particular, when the control signal to achieve the required torque does not exceed a power supply signal for energizing the motor, the control strategy selection circuit may select the high-efficiency control scheme. However, when the control signal needed to achieve the required torque exceeds the power supply signal, the control strategy selection circuit selects the high-torque control scheme.

The control strategy selection circuit may comprise a look-up table responsive to actual speed of the vehicle and torque required to achieve the desired speed for outputting the control current representing the selected motor control scheme.

The present invention may be manifested in a control system for a multiphase motor having a plurality of stator phase components, each stator phase component comprising a phase winding formed on a core element, and a permanent magnet rotor. Preferably, each of the stator core elements comprises ferromagnetic material separated from direct contact with the other core elements, each stator phase component thereby forming an autonomous electromagnet unit. Stator energization current is provided by a direct current power supply through circuitry coupled to a controller. The controller can access any of a plurality of stored motor control schemes to implement stator energization current having a corresponding waveform profile. The stored motor control schemes are determinative of the current waveform profiles and, when accessed, are incorporated into controller operation.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
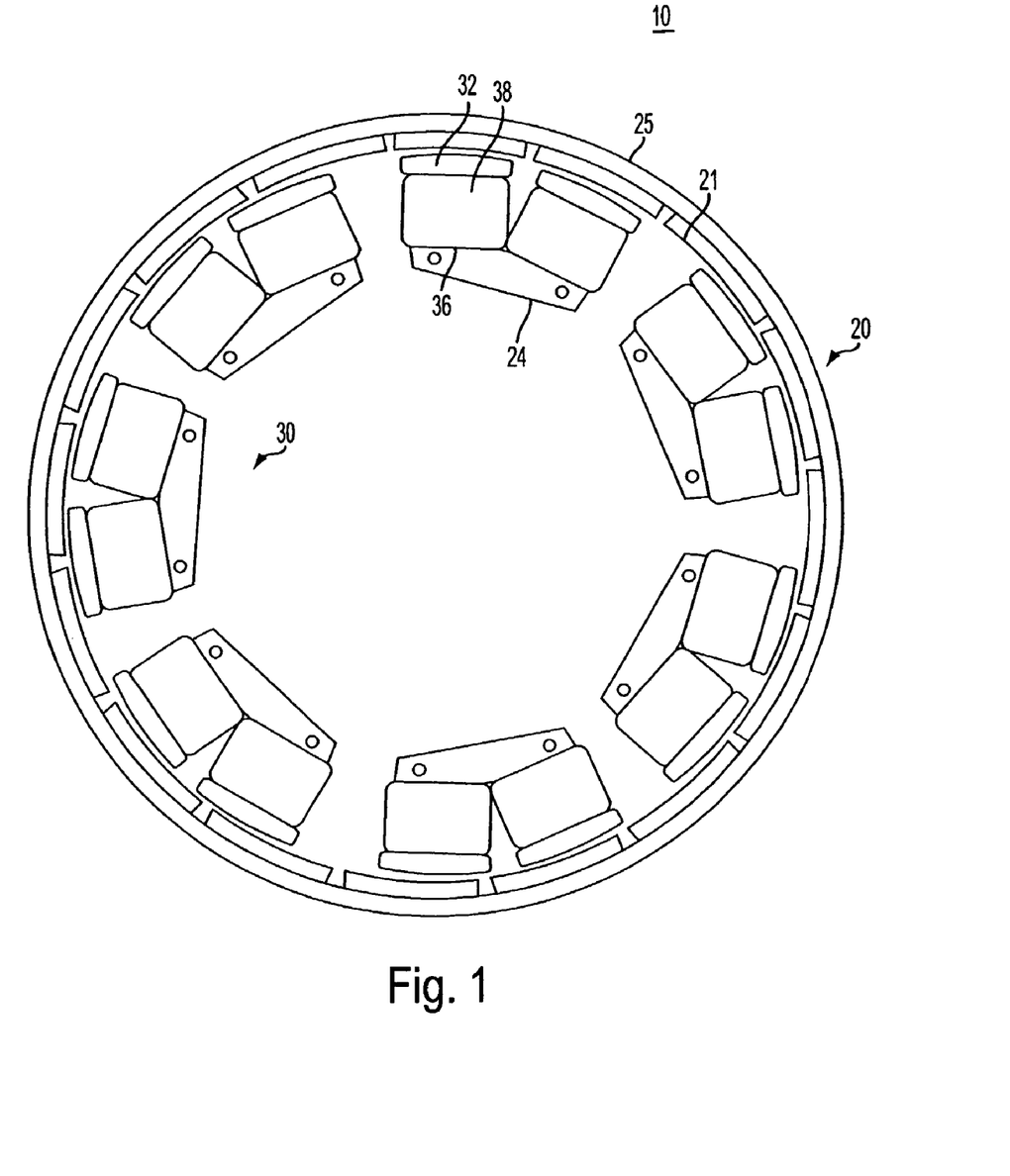
FIG. 1 is an exemplary view showing rotor and stator elements in a configuration that may be employed in the present invention.

The present invention is applicable to a vehicle driven by an electric motor such as disclosed in the copending application Ser. No. 09/826,422, although the invention can be used with various other permanent magnet motors. FIG. 1 thus is an exemplary view showing rotor and stator elements of a motor 10 as described in that application, the disclosure of which has been incorporated herein. Rotor member 20 is an annular ring structure having permanent magnets 21 substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases. The concepts of the invention, more fully described below, are also applicable to other permanent magnet motor structures, including a unitary stator core that supports all of the phase windings.

Figure 2:
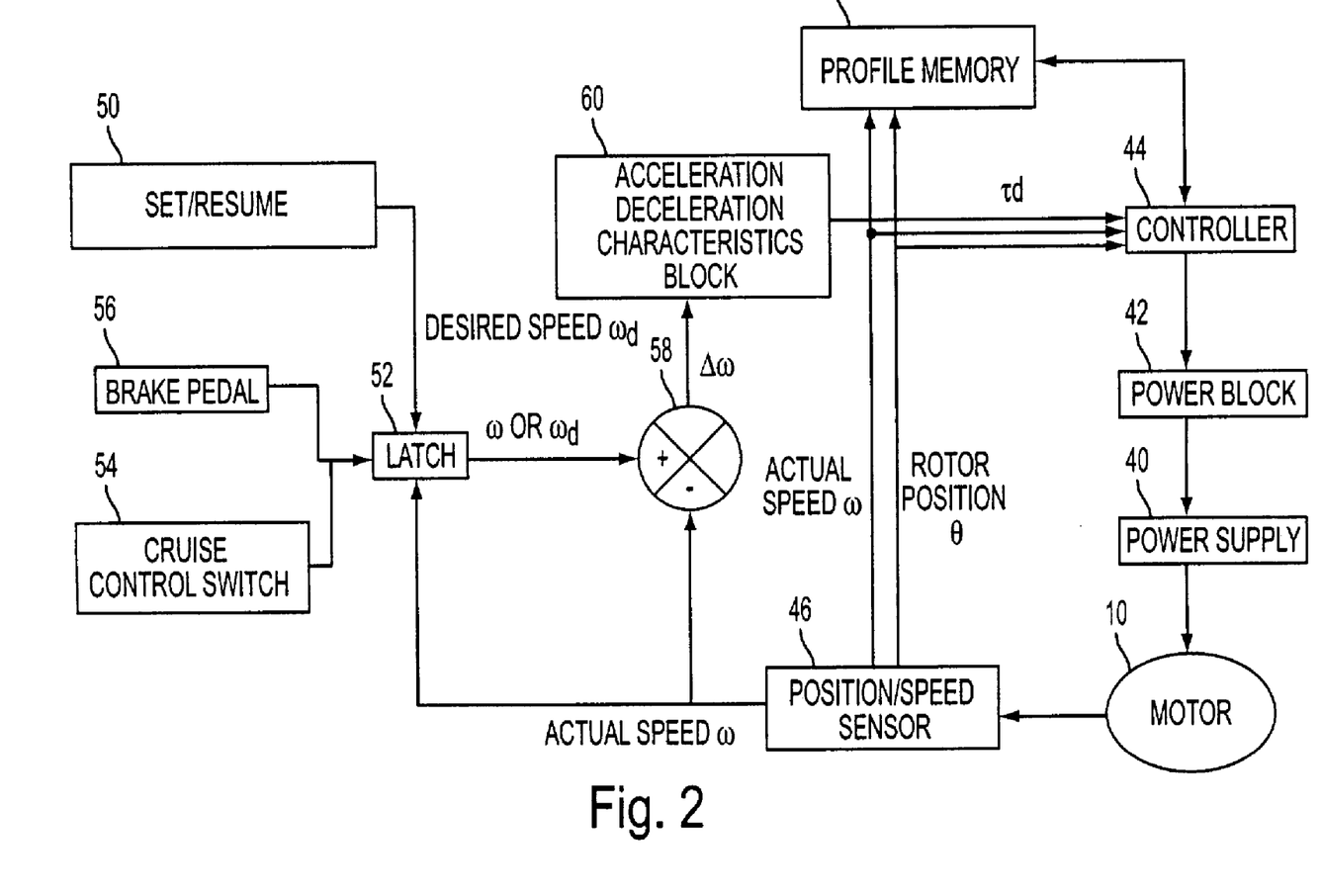
FIG. 2 is a block diagram of an adaptive cruise control system in accordance with the present invention.

FIG. 2 is a block diagram of an adaptive cruise control system in accordance with the present invention. A plurality of stator phase windings 38 (FIG. 1) of the multiphase motor 10 are switchably energized by driving current supplied from d-c power source 40 via hybrid power block 42. The power block 42 may comprise electronic switch sets that are coupled to controller 44 via a pulse width modulation converter and gate drivers. Each phase winding is connected to a switching bridge having control terminals connected to receive pulse modulated output voltages from the controller. Alternatively, the switching bridges and gate driver components may be replaced by amplifiers linked to the controller output voltages.

Rotor position and speed sensor 46 provides rotor position and speed feedback signals to the controller 44. The sensor 46 may comprise a well-known resolver, encoder or their equivalents and a speed approximator that converts the position signals to speed signals in a well-known manner.

The controller 44 may comprise a microprocessor or equivalent microcontroller, such as Texas Instrument digital signal processor TMS320LF2407APG. Coupled to the controller may be RAM and ROM memories for storing programs and data used in the controller's operation. Profile memory 48 is shown separately in the drawing for purposes of illustration of the inventive concepts. The profile memory 48 may comprise a look-up table for storing motor control scheme data that determine motor current waveform profiles selectable in accordance with driving conditions.

As discussed in more detail below, the motor control schemes stored in the profile memory 48 are selected based on a torque command $\tau_d$, actual speed $\omega$ of the vehicle and rotor position $\theta$ that may be determined by the position/speed sensor 46. The torque command $\tau_d$ determines torque required to achieve the desired speed $\omega_d$ maintained by the cruise control system.

In a well known manner, the desired speed is defined by set/resume switch 50 that sets the desired speed in the cruise control system, or commands the system to resume the desired speed set previously. The desired speed value is supplied to latch 52 that monitors cruise control switch 54 to determine whether a cruise control mode is set, and monitors brake pedal 56 to determine whether the cruise control mode is released. Subtracting unit 58 determines the difference $\Delta\omega$ between the actual speed and the desired speed. Based on this difference, acceleration/deceleration characteristics unit 60 determines the torque command $\tau_d$ required to achieve the desired speed. The acceleration/deceleration characteristics unit 60 calculates torque using a well-known algorithm for determining torque for particular acceleration and deceleration characteristics.

Figure 3:
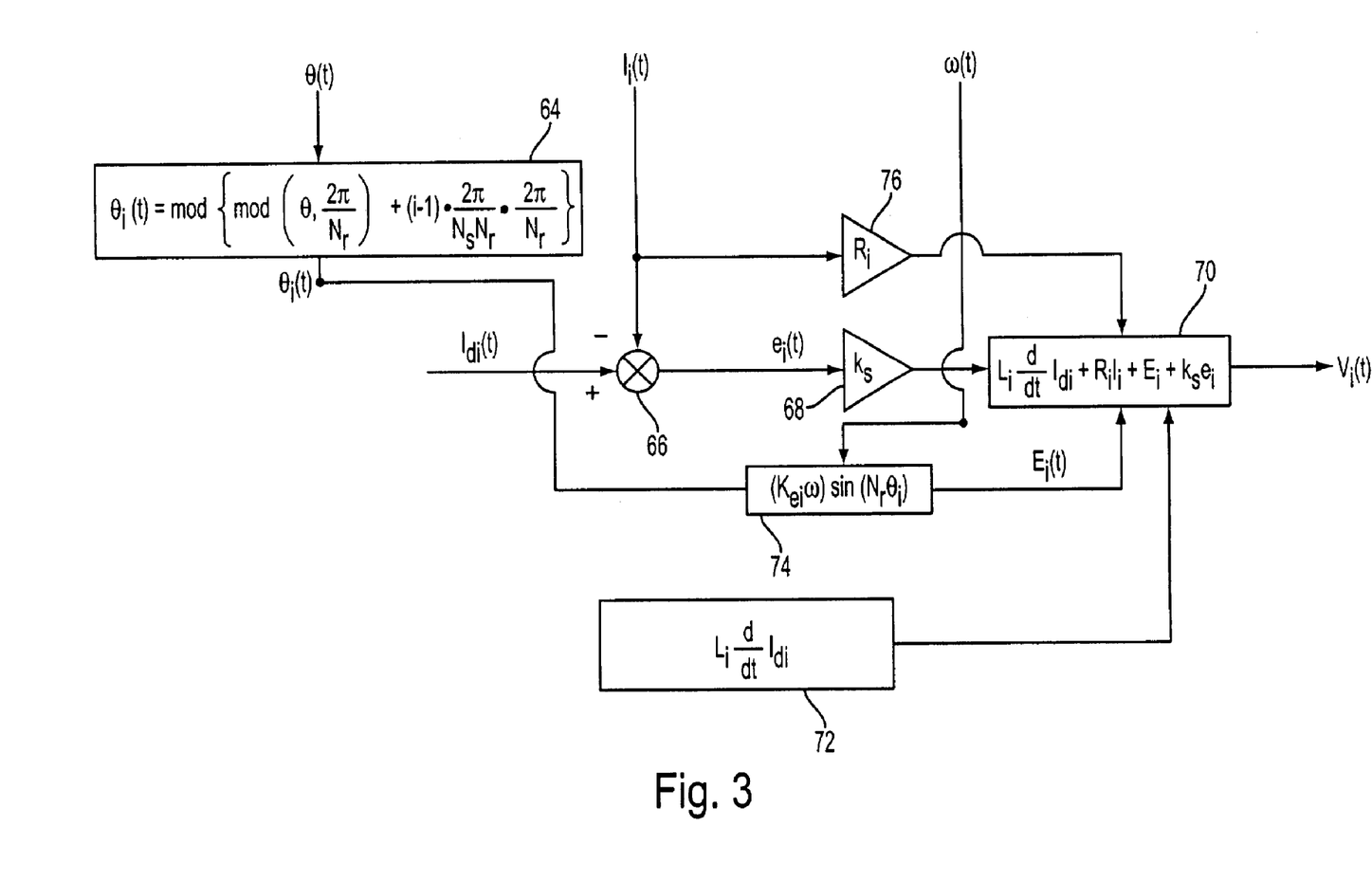
FIG. 3 is a block diagram that illustrates controller methodology for use in the cruise control system of FIG. 2.

FIG. 3 is a block diagram that illustrates operation of the controller 44 in the cruise control system of the present invention. In order to develop the desired phase currents the following per-phase voltage control expression is applied to the driver for the phase windings:

$$V_i(t) = L_i dI_{di}/dt + R_i I_i + E_i + k_{si} e_i$$

where $V_i(t)$ is the voltage across the phase winding;
$I_{di}(t)$ is the desired phase current to be produced to obtain torque required to achieve the desired speed $\omega_d$;
$I_i(t)$ is the phase current;
$R_i$ is the winding resistance;
$E_i(t)$ is the back-EMF;
$L_i$ is the winding self-inductance;
$k_{si}$ is the current loop feedback gain; and
$e_i$ is the phase current error.

FIG. 3 represents the methodology, generally indicated by reference numeral 60, by which the controller 44 derives the components of this voltage control expression in real time. As described in more detail below, the desired phase current $I_{di}(t)$ is provided by the profile memory 48 in accordance with a motor control scheme selected by the cruise control system.

The desired phase current $I_{di}(t)$, dependent upon the particular motor control scheme implemented, defines the manner in which the cruise control system responds to the torque command requested by the system to achieve the desired speed. A significant aspect of the present invention is provision of a plurality of available motor control schemes adaptively selected by the cruise control system to obtain a desired response. Each control scheme effects a particular motor current waveform profile having unique characteristics with respect to efficiency, torque capacity, response capability, power losses, etc., in comparison to other control schemes.

As shown in FIG. 3, rotor position $\theta(t)$ is input to controller function block 64 that produces an output representing excitation angle $\theta_i(t)$ based on the rotor position, the number of permanent magnet pole pairs ($N_r$) the number of stator phases ($N_s$) and the phase delay of the particular phase. The phase current $I_i(t)$ in each phase winding is sensed by a respective one of a plurality of current sensors whose outputs are provided to controller 44.

Controller function block 66 calculates the difference between the desired phase current $I_{di}(t)$ received from the profile memory 48 and the phase current $I_i(t)$ to output a phase current track error signal $e_i(t)$. This error signal is multiplied by gain factor $k_s$ in controller function block 68. The effect of the current feedback gain is to increase overall system robustness via the rejection of system disturbances due to measurement noise and any model parameter inaccuracies. The output of block 68 is fed to controller function block 70. Block 70 outputs time varying voltage signals $V_i(t)$ to the power block 42 for the selective controlled energization of the phase windings 38. Voltage $V_i(t)$ has components that compensate for the effects of winding inductance, induced back-emf and winding resistance.

To compensate for the presence of inductance within phase windings, the term $L_i dI_{di}/dt$, wherein $dI_{di}/dt$ denotes the standard time derivative of the desired phase current $I_{di}(t)$, is input to the controller function block 70 to be added in the phase voltage calculation. The term $L_i dI_{di}/dt$ shown in block 72 is provided by a look-up table in the profile memory 48 based on the received inputs of $\tau_d(t)$, $\theta_i(t)$ and $\omega$ (t).

To compensate for the induced back-emf voltage the term $E_i$ is added in the phase voltage calculation as an input to function block 70 from controller function block 74. The back-emf compensation value is derived from the excitation angle and speed, received as inputs to block 74 using back-emf coefficient $K_{ei}$. To compensate for voltage drop attributed to phase winding resistance and parasitic resistance, the term $R_i I_i(t)$ is added in the phase voltage calculation as an input to function block 70 from controller function block 76. In operation, controller 44 successively outputs control signals $V_i(t)$ for individual energization of respective phase windings.

Figure 4:
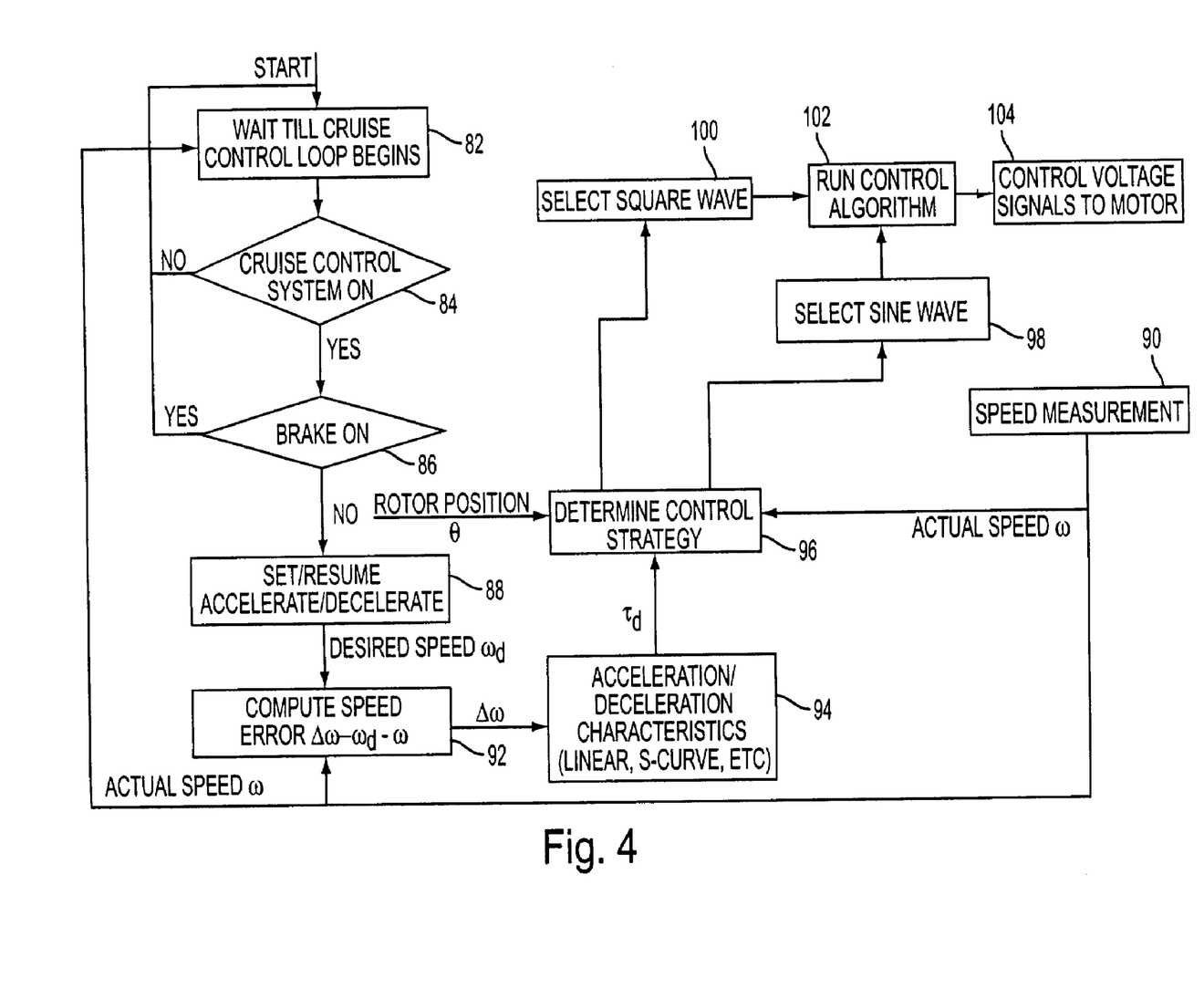
FIG. 4 is a flow chart for operation of the adaptive cruise control system in accordance with the present invention.

FIG. 4 is a flow chart illustrating operation of the adaptive cruise control system of the present invention. After an appropriate delay to wait until a cruise control loop begins (step 82), the cruise control system checks whether or not the switch 54 for engaging cruise control operation is in an ON state (step 84). If so, the cruise control system checks whether the brake pedal 56 was pressed after engaging the cruise control operation (step 86). If so, the cruise control operation is terminated. However, if the brake pedal was not pressed, the system determines the desired speed $\omega_d$ to be maintained (step 88). The desired speed is defined in a well know manner by set/resume switch 50 that sets the desired speed in the cruise control system, or commands the system to resume the desired speed set previously.

The actual speed $\omega$ measured in a well-known manner (step 90) is compared with the desired speed $\omega_d$ to calculate the speed error $\Delta\omega$ as the difference between the actual speed and the desired speed (step 92). The torque command $\tau_d$ that defines torque required to achieve the desired speed $\omega_d$ is determined based on the speed error and a desired acceleration/deceleration characteristics (step 94). For example, the torque command may be determined for linear or S-curve acceleration/deceleration characteristics based on well-known algorithms.

The torque command, actual speed and rotor position are input to the look-up table of pre-computed motor control scheme data in the profile memory 48. The look-up table may store motor control scheme data for supporting various modes of operation manifesting different operational aspects. For example, a high-efficiency motor control scheme may be utilized to energize the phase windings with current of sinusoidal waveform for high efficiency operation. The sinusoidal current waveform profile obtained with this motor control scheme can extend battery life.

The sinusoidal wave current trajectory $I_{sin}(t)$ of the desired phase current $I_{di}(t)$ supplied to the controller 44 is generated from the following equation $$I_{sin} = I_m \sin(N_r \theta_i),$$

where $I_m = 2\tau_d/N_s K_{\tau i}$ denotes the phase current magnitude, $N_r$ denotes the number of permanent magnet pairs, $\theta_i$ denotes the measured per phase rotor position signal, $N_s$ represents the total number of phase windings, and $K_{\tau i}$ denotes a per-phase torque transmission coefficient. This sinusoidal current waveform profile provides efficient motor operation.

Different expressions can be used to obtain different current waveform profiles for manifesting other operational aspects, although sacrificing some of the efficiency achieved with the sinusoidal waveform profile. For example, for higher torque operation, a high-torque motor control scheme may be utilized to obtain a square wave current waveform trajectory $I_{sq}(t)$ of the desired phase current $I_{di}(t)$ supplied to the controller 44. The square wave current waveform trajectory $I_{sq}(t)$ may be obtained using the following expression:

$$I_{sq} = I_m sgn(\sin(N_r \theta_i))$$

where sgn (x) denotes the standard signum function and is defined as 1 if x>0, 0 if x=0, and −1 if x<0. Practically, the square wave current waveform $I_{sq}(t)$ has a trapezoidal shape with configurable rising and falling edges.

Profile memory 48 stores data that are used by the controller 44 to obtain the current values that satisfy the expressions exemplified above. The data may be stored as a lookup table, each entry of which represents a value of the desired phase current $I_{di}(t)$ supplied to the controller 44, for a particular combination of torque command value and rotor position for the corresponding motor control scheme. Another section of the lookup table may store corresponding values of the term $L_i dI_{di}/dt$ for the selected desired phase current $I_{di}(t)$.

If a control scheme is selected for which the sinusoidal waveform is produced, the corresponding profile memory data is accessed. Square wave profile memory data would be accessed if the corresponding control scheme is selected. Alternatively, the profile memory may store data for each profile with which the desired current value $I_{di}$ is repeatedly computed by the controller 44 in real time. While expressions for sinusoidal and square wave waveforms have been set forth above for purposes of illustration, other waveform profiles, such as sawtooth, etc., may be utilized for different operational purposes.

Hence, the controller 44 at step 96 interacts with the profile memory 48 to determine a control strategy appropriate for current driving conditions. In particular, the controller determines whether or not the cruise control system, in the high-efficiency profile motor control scheme, has the capability of meeting the torque command requirements to maintain the desired speed. Such determination can be made with reference to the value of the voltage $V_i(t)$ from the output of block 70 of FIG. 3 that would be derived from values of the torque command and the motor speed.

The torque demands can be met if the derived control voltages do not exceed the voltage level of the power supply. If the derived level of this output does not exceed the power supply voltage as determined in step 96, the controller can apply the voltage required by the high efficiency motor control scheme for torque tracking. The controller, after any appropriate delay, will then access the profile memory 48 to retrieve efficiency motor scheme data from the lookup table at step 98. If, instead, the derived voltage level is higher than the power supply voltage, determination is made at step 96 that the power supply capacity is exceeded. The controller, after any appropriate delay, will then access the profile memory to retrieve high-torque motor control scheme data from the lookup table at step 100.

With the sinusoidal waveform profile, if the cruise control system requests a torque command that correlates to the maximum current draw, then the motor output is limited to approximately 54 Nm. The square wave profile, however, can produce 68 Nm without exceeding the 10 amp maximum rating of the power supply. However, the increase in torque production of the square wave profile is gained at the expense of efficiency with respect to the sinusoidal profile.

Figure 5:
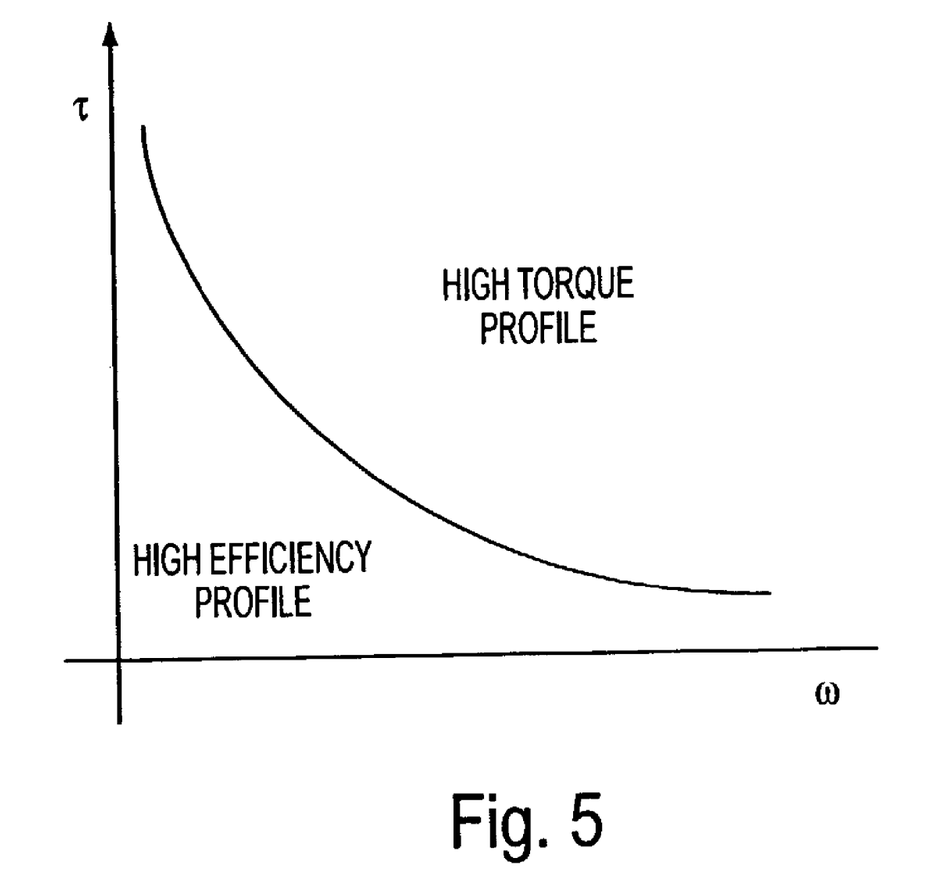
FIG. 5 is a curve representing motor control scheme selection for ranges of torque and speed in accordance with the present invention.

While the motor control scheme selection represented by step 96 can be performed by repeated calculation of a torque capacity threshold on a real time basis, calculations of voltage for various combinations of torque request and motor speed can be made in advance and linked with the appropriate profile in a lookup table in the profile memory. FIG. 5 is a curve that represents a boundary in such a lookup table between ranges for efficiency motor control scheme selection and high-torque motor control scheme selection for values of torque and speed in accordance with the illustrated example. The lookup table is formulated by making the above described controller voltage/supply voltage comparison for a multitude of speed/requested torque combinations. With the abscissa of the graph representing speed and the ordinate representing requested torque, the curve is asymptotic to both axes with speed/torque combinations above the curve being beyond the capacity of the system to track torque in the high efficiency profile operational mode. The controller 44 upon accessing this lookup table will select the high-efficiency motor control scheme for speed/torque combinations represented by points below the curve and select the high-torque motor control scheme for the remaining points.

Controller 44 successively outputs control signals $V_i(t)$ to the power block 42 for individual energization of respective phase windings in a sequence established in the controller. Each successive control signal $V_i(t)$ is related to the particular current sensed in the corresponding phase winding, the immediately sensed rotor position and speed, and also to model parameters, $K_{ei}$ and $K_{\tau i}$, that have been predetermined specifically for the respective phases.

Based on selected waveform profile of the desired phase current $I_{di}(t)$, the controller derives the value of the voltage $V_i(t)$ in real time, utilizing the torque command value and the signals received from phase current sensors, position sensor and speed detector (step 102). The computations illustrated in FIG. 3 are performed successively in real time. In addition to the term $L_i dI_{di}/dt$, the lookup table in the profile memory 48 may store the back-EMF value $E_i$ used in the calculation of the voltage $V_i(t)$. The value $E_i$ may be selected from the lookup table based on a combination of speed and rotor position.

Then, the controller 44 successively outputs control signals $V_i(t)$ to the power block 42 for individual energization of respective phase windings in a sequence established in the controller (step 104). Each successive control signal $V_i(t)$ is related to the particular current sensed in the corresponding phase winding, the immediately sensed rotor position and speed, and also to model parameters, $K_{ei}$ and $K_{\tau i}$, that have been predetermined specifically for the respective phases.

In this disclosure there is shown and described only preferred embodiments of the invention and a few examples of its versatility. It is to be understood that the invention is capable of use in various other combinations and environments and is capable of changes or modifications within the scope of the inventive concept as expressed herein. For example, various other motor control schemes defining different current waveform profiles may be utilized. The profile memory thus may store a plurality of motor control scheme data sets accessible by the controller in response to receipt of specific motor control scheme selection commands. Various lookup tables of varying complexities can be formulated for appropriate profile mode selection by the controller.

What is claimed is:

1. A system for adaptively controlling an electric vehicle to maintain a desired speed, comprising:
    a control circuit for producing a control signal to control an electric motor of the vehicle, the control signal being formed based on a control current required to achieve the desired speed; and
    a control strategy selection circuit for selecting between at least two motor control schemes that define waveform profiles of the control current.

2. The system of claim 1, wherein the control strategy selection circuit is configured to select a high-efficiency control scheme that provides a waveform profile for achieving operating efficiency of the motor, when the high-efficiency control scheme enables the vehicle to achieve the desired speed.

3. The system of claim 2, wherein the control strategy selection circuit is configured to select a high-torque control scheme that provides a waveform profile for achieving high torque, when the high-efficiency control scheme is not sufficient to achieve the desired speed.

4. The system of claim 3, wherein the operating efficiency waveform profile has a substantially sinusoidal waveshape.

5. The system of claim 3, wherein the high-torque waveform profile has a substantially rectangular waveshape.

6. The system of claim 3, wherein the control strategy selection circuit is configured to select the motor control scheme in response to actual speed of the vehicle and torque required to achieve the desired speed.

7. The system of claim 6, wherein the control strategy selection circuit is configured to select the high-efficiency control scheme when the required torque does not exceed a threshold level.

8. The system of claim 6, wherein the control strategy selection circuit is configured to select the high-torque control scheme when the required torque exceeds the threshold level.

9. The system of claim 6, wherein the control strategy selection circuit is configured to select the high-efficiency control scheme when the control signal needed to achieve the required torque does not exceed a power supply voltage for energizing the motor.

10. The system of claim 9, wherein the control strategy selection circuit is configured to select the high-torque control scheme when the control signal needed to achieve the required torque exceeds the power supply voltage.

11. The system of claim 1, wherein the control strategy selection circuit comprises a look-up table responsive to actual speed of the vehicle and torque required to achieve the desired speed for outputting the control current representing the selected motor control scheme.

12. The system of claim 1, wherein the motor is a multiphase permanent magnet motor having a stator with a plurality of phase windings.

13. The system of claim 12, wherein the motor stator comprises a plurality of ferromagnetically autonomous electromagnets, each electromagnet having wound thereon one of the phase windings.

14. The system of claim 13, wherein the control circuit produces the control signal to successively energize each phase winding of the motor.

15. A method of adaptively controlling an electric vehicle to maintain a desired speed, comprising the step of:
    based on control current, forming a control signal to control an electric motor of the vehicle, and
    selecting a motor control scheme providing an appropriate waveform profile of the control current.

16. The method of claim 15, wherein the step of selecting comprises selecting a high-efficiency control scheme that provides a waveform profile for achieving operating efficiency of the motor, when the high-efficiency control scheme enables the vehicle to achieve the desired speed.

17. The method of claim 15, wherein the step of selecting comprises selecting a high-torque control scheme that provides a waveform profile for achieving high torque, when the efficiency control scheme is not sufficient to achieve the desired speed.

18. The method of claim 17, wherein the operating efficiency waveform profile has a substantially sinusoidal waveshape.

19. The method of claim 17, wherein the high-torque waveform profile has a substantially rectangular waveshape.

20. The method of claim 17, wherein the motor control scheme is selected in response to actual speed of the vehicle and torque required to achieve the desired speed.

21. The method of claim 20, wherein the high-efficiency control scheme is selected when the required torque does not exceed a threshold level.

22. The method of claim 20, wherein the high-torque control scheme is selected when the required torque exceeds the threshold level.

23. The method of claim 17, wherein the high-efficiency control scheme is selected when the control signal needed to achieve the required torque does not exceed a power supply voltage for energizing the motor.

24. The method of claim 23, wherein the high-torque control scheme is selected when the control signal needed to achieve the required torque exceeds the power supply voltage.

25. A system for controlling an electric machine, comprising:
    a control circuit for producing a control signal to control the electric machine, the control signal determined from a control current required to achieve a desired speed of th electric machine; and
    a control strategy for selecting between at least one low efficiency control scheme and one high efficiency control scheme, wherein the control schemes define different waveform profiles of a control current to control the torque of the electric machine.

* * * * *